UNITED STATES PATENT OFFICE.

MAX FREMERY, EMIL BRONNERT, AND JOHANN URBAN, OF OBERBRUCH, GERMANY.

PROCESS OF MAKING CUPRAMMONIUM SOLUTIONS.

SPECIFICATION forming part of Letters Patent No. 658,632, dated September 25, 1900.

Application filed June 29, 1900. Serial No. 22,089. (No specimens.)

*To all whom it may concern:*

Be it known that we, MAX FREMERY, EMIL BRONNERT, and JOHANN URBAN, subjects of the Emperor of Germany, residing at Oberbruch, Rheinpreussen, Germany, have invented certain new and useful Improvements in the Manufacture of Cuprammonium Solutions, of which the following is a full and exact specification.

Cuprammonium solution has been manufactured hitherto by covering copper strips with strong ammonia solution, through which is bubbled at the ordinary temperature air amounting per hour to about forty times the volume of the gaseous ammonia dissolved in the liquid. After some six hours the solution contains about ten to fifteen per cent. of ammonia and 2 to 2.5 per cent. of copper. A stronger solution than this cannot be obtained in this manner. It has also been proposed to make cuprammonium solution by introducing a stream of air and gaseous ammonia from below into towers filled with copper strips and down which water is running. As the absorption of ammonia gas in water causes a rise of temperature, the towers have been surrounded by water-jackets to keep the solution cool enough to retain in solution the large quantity of ammonia necessary. By this procedure the solution does not contain more than the above-mentioned proportion of copper, and a large quantity of ammonia is used, it being indeed necessary, since the solutions are intended to be stable at the ordinary temperature. By the present invention there is manufactured a solution of cuprammonium containing up to five per cent. of copper and about sixteen per cent. of ammonia. This solution is much more valuable for the purpose to which cuprammonium is applied—namely, the dissolution of cellulose—than is that solution poorer in copper, for the proportion of cellulose it will dissolve is much greater.

The invention consists in covering copper strips with ammonia solution, containing about sixteen per cent. of ammonia, and bubbling air through the mixture, which is kept at a temperature between 0° and 5° centigrade. For example, into a tall cylinder are introduced copper strips, which are then covered with ammonia solution of about sixteen-per-cent. strength. Cold compressed air is then bubbled through the liquid, care being taken that the temperature does not rise above 5° centigrade. If necessary for the latter purpose, the cylinder is surrounded by a second one, and a strongly-cooled brine is circulated in the space between the two cylinders. The solution thus obtained contains between four and five per cent. of copper and is stable only in the cold. At temperatures higher than 5° centigrade copper hydroxide separates from the solution until the liquid contains between 2 and 2.5 per cent. of copper.

Having thus described the nature of our said invention and the best means we know of carrying the same into practical effect, we claim—

Process for the production of cuprammonium solution consisting in treating a mixture of copper and ammonia solution of sixteen-per-cent. strength with air, the said mixture being kept at a temperature below 5° centigrade.

In witness whereof we have hereunto set our hands in presence of two witnesses.

MAX FREMERY.
EMIL BRONNERT.
JOHANN URBAN.

Witnesses:
  JOS. SCHOLZ,
  KARL SCHMITT.